R. M. & L. S. CAMPBELL.
ADMISSION REGISTERING MECHANISM.
APPLICATION FILED DEC. 1, 1915.
1,275,128.
Patented Aug. 6, 1918.
3 SHEETS—SHEET 1.
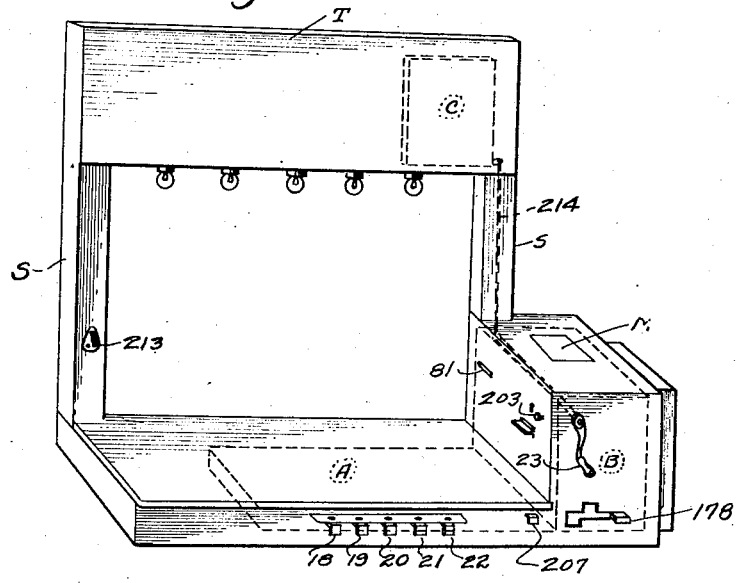
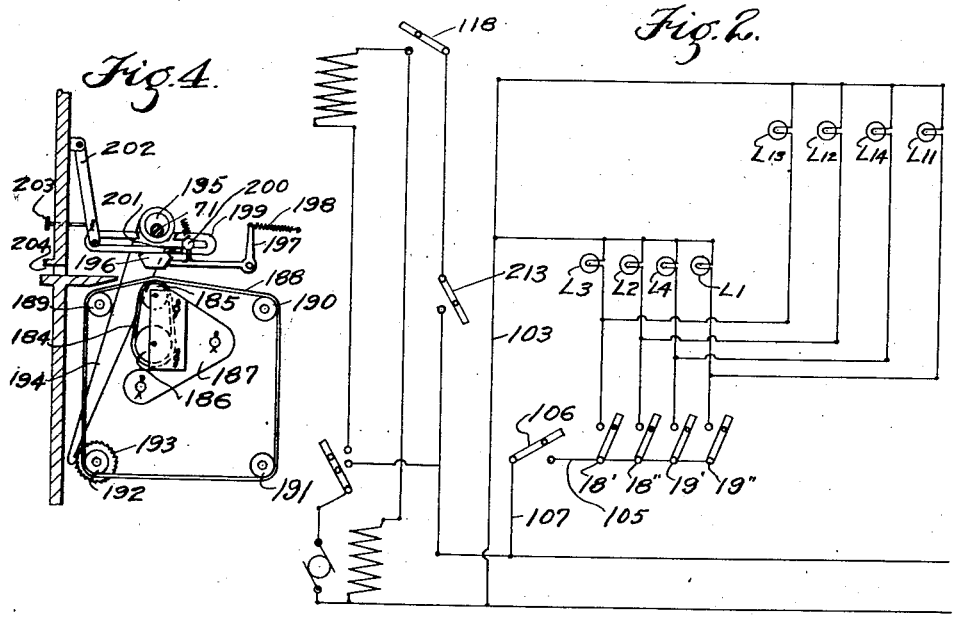
Inventors
Robert M. Campbell.
Lawrence S. Campbell.
By Edmund P. Thompson
Atty.

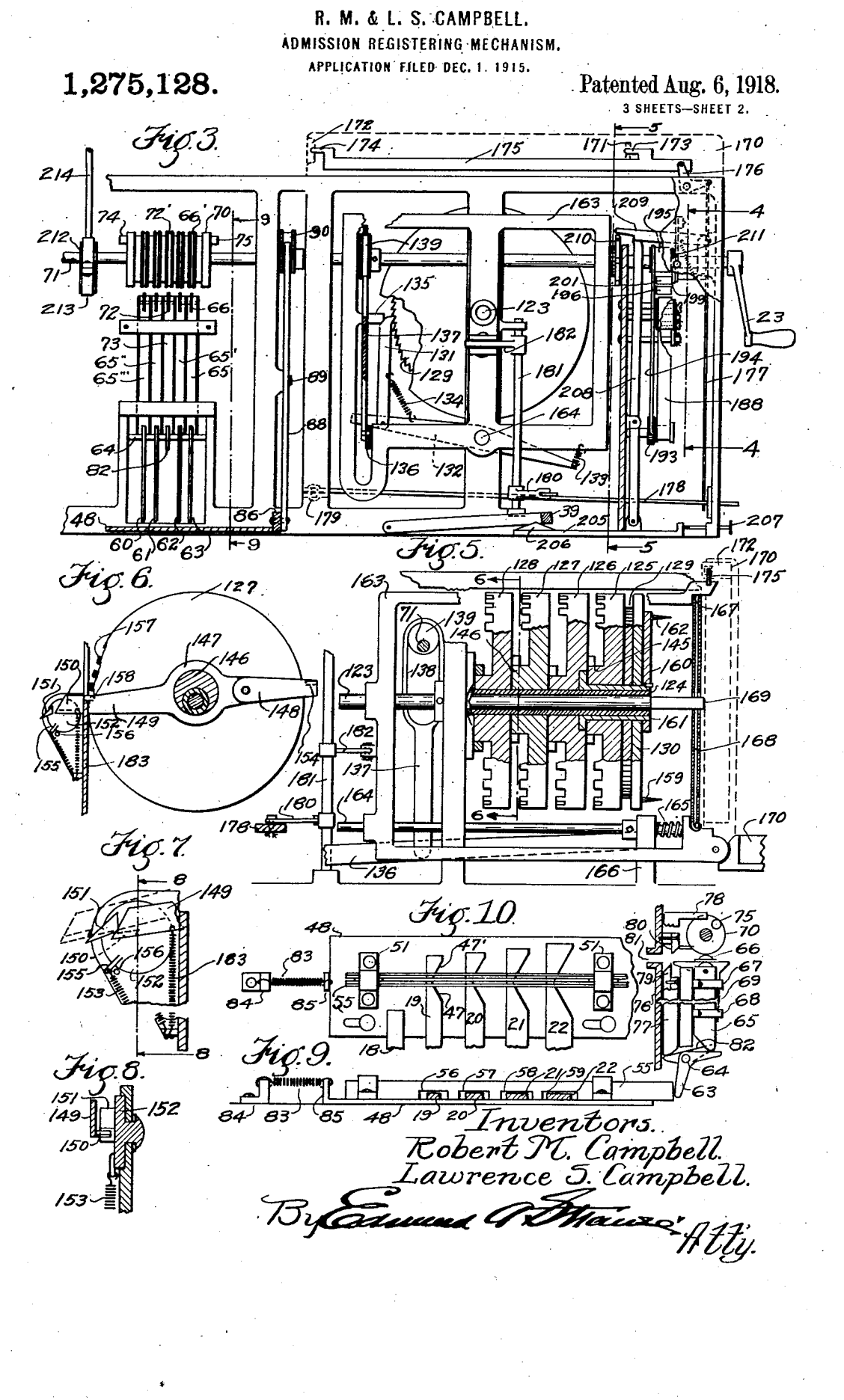

R. M. & L. S. CAMPBELL.
ADMISSION REGISTERING MECHANISM.
APPLICATION FILED DEC. 1, 1915.
1,275,128.
Patented Aug. 6, 1918.
3 SHEETS—SHEET 3.
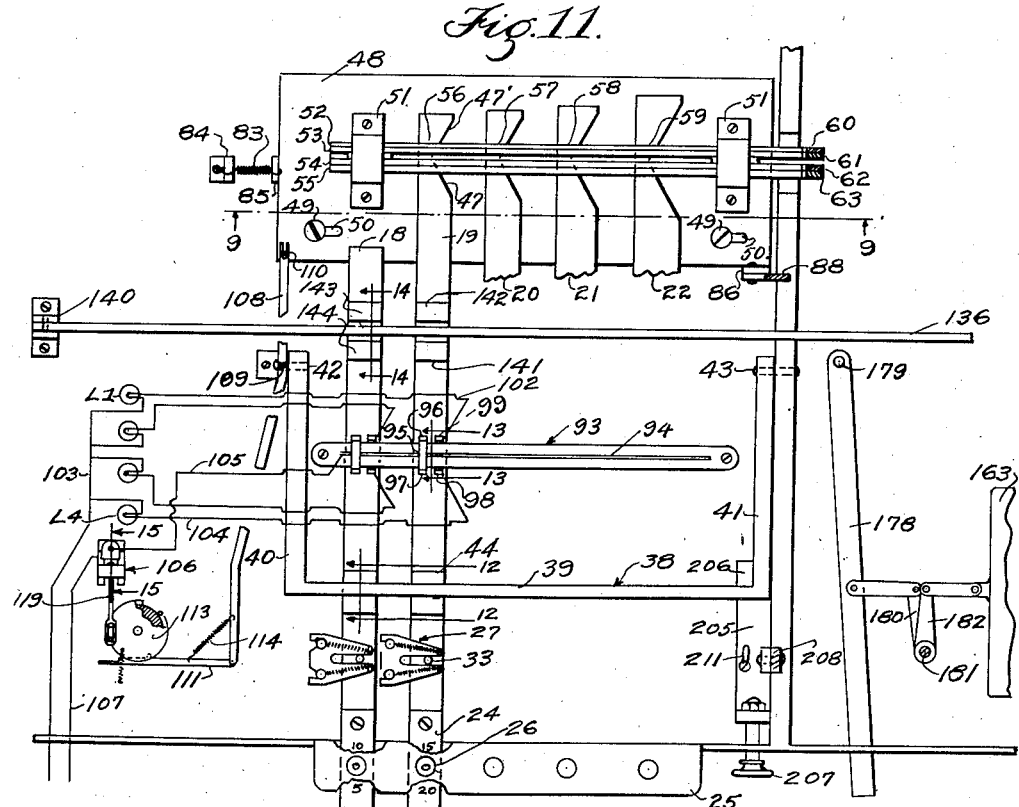
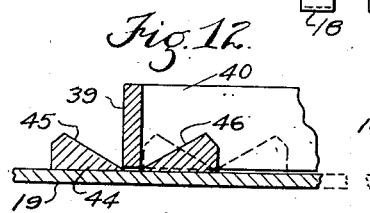
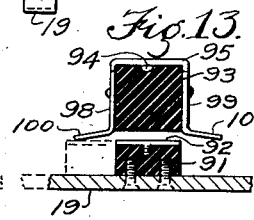
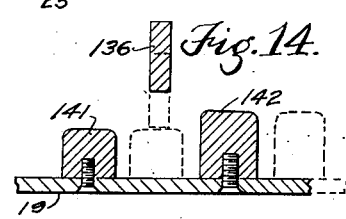
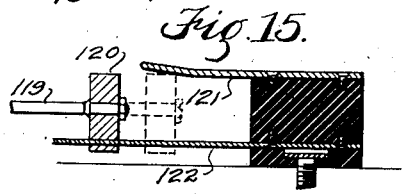
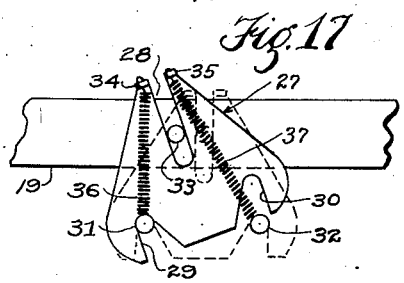
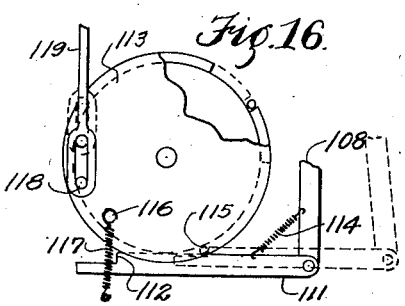
Inventors.
Robert M. Campbell.
Lawrence S. Campbell.
By Edward A. Stamper
Atty.

UNITED STATES PATENT OFFICE.

ROBERT M. CAMPBELL AND LAWRENCE S. CAMPBELL, OF LOS ANGELES, CALIFORNIA.

ADMISSION-REGISTERING MECHANISM.

1,275,128.  Specification of Letters Patent.  Patented Aug. 6, 1918.

Application filed December 1, 1915. Serial No. 64,449.

*To all whom it may concern:*

Be it known that we, ROBERT M. CAMPBELL and LAWRENCE S. CAMPBELL, citizens of the United States and the Dominion of Canada, respectively, residing at Los Angeles, in the county of Los Angeles and State of California, have invented new and useful Improvements in Admission-Registering Mechanism, of which the following is a specification.

This invention relates to an admission registering and controlling mechanism, and pertains especially to mechanism for registering the payment of admission fees to an auditorium or like place.

The object of this invention is to provide means to make a cipher record of the total amount registered at any desired time, such as when change of cashiers is made.

We accomplish the above objects by means of the mechanism illustrated in the accompanying drawings, in which:

Figure 1 is a perspective view of the apparatus as incased for use in a ticket office.

Fig. 2 is a diagrammatic view of the wiring of the system.

Fig. 3 is a side elevation of the embossing, adding and printing mechanism.

Fig. 4 is a front elevation of the printing mechanism as seen on the line 4—4 of Fig. 3.

Fig. 5 is a front elevation of the adding and cipher recording mechanism as seen on the line 5—5 of Fig. 3, parts being broken away and shown in section to more clearly illustrate the mechanism.

Fig. 6 is a sectional view of an adding wheel detail, as seen on the line 6—6 of Fig. 5.

Fig. 7 is an enlarged detail of the pawl mechanism, shown in Fig. 6.

Fig. 8 is a section as seen on the line 8—8 of Fig. 7.

Fig. 9 is a broken sectional front elevation as seen on the line 9—9 of Fig. 11, showing details of the ticket embossing mechanism and control keys.

Fig. 10 is a fragmentary plan view of the structure shown in Fig. 9 showing the control keys.

Fig. 11 is a plan view of the control keys and elements operated thereby, parts being broken away.

Fig. 12 is an enlarged section as seen on the line 12—12 of Fig. 11.

Fig. 13 is an enlarged section as seen on the line 13—13 of Fig. 11.

Fig. 14 is a section as seen on the line 14—14 of Fig. 11.

Fig. 15 is an enlarged section of the flash switch, as seen on the line 15—15 of Fig. 11.

Fig. 16 is an enlarged detail of the flash switch shown in Fig. 11.

Fig. 17 is an enlarged detail of the butterfly spring mechanism.

Referring particularly to Fig. 1, "A" indicates the control key mechanism which is inclosed within a casing of small depth with the control keys 18, 19, 20, 21 and 22 at the front before the cashier. "B" indicates generally the ticket embossing, adding and recording mechanism and "C" the gate control mechanism.

Upon receipt of an admission fee a control key indicating the price of the admission fee is moved by the cashier and operating handle 23 turned, thereby operating the entire mechanism except making the cipher record.

It will be noted from Fig. 1 that the mechanism is so inclosed in the casing that it may be placed upon the top of the desk or shelf at the window of a ticket office, the standards "S" at the sides of the window opening and cross casing "T" at the top of the window with indicating lights depending therefrom. The crank 23 is then convenient for operation by the right hand of the cashier. The top of the casing containing the mechanism "A" is only elevated a slight bit above the shelf upon which it rests so that the top may be used for transacting business, such as making change. The mechanism is so inclosed that no cutting of the shelf or desk is required to install the device.

Mechanism "A" is more fully shown in Figs. 9 to 17 inclusive. Referring particularly to Fig. 11 only two of the control keys are shown in full, namely, 18 and 19, the others being shown broken away. A description in detail of keys 18 and 19 will make clear the structure of the other keys which are similar to key 19.

Each of the keys slide from neutral position backward or forward, the cashier pulling or pushing the selected key. Figs. 12, 13, and 14 show key bar 19 broken between the figures with certain of the elements in position from the front of the key bar at the left of Fig. 12, toward the back of the key bar to the right of Fig. 14. At the front end, key bar 19 has secured thereto by a screw a removable indicating plate, 24, see Fig. 11, which may be changed to adapt the machine to various prices. The keys 18, 19, 20, 21, and 22 are guided at the front end in a slotted plate 25 having circular apertures 26 through which numerals marked on the indicating plate will show when a key bar is moved from neutral position. Thus on key 19 there may be a numeral 15 at the back and 20 at the front, so that when key 19 is pulled forward 15 will show through aperture 26 and when pushed backward 20 will show through aperture 26, thereby indicating 15¢ or 20¢ as the case may be.

Butterfly member 27, more particularly shown in Fig. 17, is a plate having a long slot 28 and notches 29 and 30. Pins 31 and 32 are fixed to the stationary frame or casing of the machine and are arranged so that they will be disposed within the notches 29 and 30 when the butterfly is in neutral position, such as shown in full lines in Fig. 11 and in dotted lines in Fig. 17. A pin 33 fixedly secured to key bar 19 is positioned in slot 28 for sliding movement therein. The butterfly is provided adjacent the end of the slot 28 with lugs 34 and 35 to which are secured springs 36 and 37, the opposite end of the springs being secured to pins 31 and 32. The butterfly mechanism tends to maintain the key bar 19 in neutral position. When the bar is moved to the left, as shown in Fig. 17, the butterfly 27 will turn about pin 31 placing spring 37 under tension. The spring tending to return the butterfly to the neutral position and therewith the bar. A movement of the key bar to the right will in a similar manner place spring 36 under tension tending to return the butterfly and bars to neutral position. Each key bar is provided with a butterfly returning device.

Mounted upon the frame of the machine is a pivoted bail 38 as particularly shown in Fig. 11. Bail 38 comprises a cross bar 39 and arms 40 and 41. Arms 40 and 41 are pivoted to the frame, as indicated at 42 and 43, so that the bail is pivoted about a horizontal axis. Referring to Fig. 12, a key holding keeper comprising a block 44 is shown having wedge faces 45 and 46. Block 44 is fixedly secured to the bar 19, so that if the bar is pushed forward toward the right as indicated by dotted lines in Fig. 12, the bail 38 will be lifted, cross bar 39 riding over the wedge face 45 and dropping behind the block 44, thereby locking it in position. By this movement the butterfly member 27 will be moved out of its neutral position and will tend to return the bar to neutral position. If the key bar 19 is pulled toward the left, bail 38 will be raised, cross bar 39 riding over wedge face 46 and dropping in front of block 44 locking the bar in position. In order to release the key bar, it is necessary to lift the bail. Each key bar is provided with a block similar to 44 so that upon the operation of any key bar the bail will be raised and if any other key bar is in neutral position the butterfly mechanism connected therewith will snap it back to its neutral position.

Key bar 19 is provided adjacent its rear end with tapered sides 47 and 47'. Each of the key bars, except 18, is constructed in this manner. A movable bed comprised of a plate 48 is secured to the frame of the machine in any suitable manner, such as by screws 49 which are fixedly secured to the frame and are mounted in slots 50 in plate 48. Mounted upon the plate 48 are brackets 51 which serve as guides for reciprocable bars 52, 53, 54, and 55. These bars are shown in Figs. 9, 10 and 11. Each of the bars is slotted, the slots in bar 55 being indicated by 56, 57, 58, and 59. The key bars 19, 20, 21 and 22 extend through the slots. The side of the slot 56 opposed to the tapered sides 47 and 47' of key 19 is so arranged that a complete movement of the key bar either forward or backward will cause either wedge face 47 or 47' to contact with the side of the slot and move the bar 55 to the right. The slots in bars 52, 53, and 54 in which is disposed key bar 19 are of such dimensions that a movement of key bar 19 forward or backward will not cause either wedge face 47 or 47' to contact the sides of the slots or in any way move the latter bar. The slots in the bars 55 and 54 in which key bar 20 is disposed have the sides arranged so that movement of the key 20 backward or forward will move bars 55 and 54, but will not move bars 53 and 52. Slots in bars 55, 54 and 53 in which key bar 21 is disposed are so constructed that movement of the latter key will move said bars. The slots in bars 52, 53, 54 and 55 in which key bar 22 is disposed are so arranged that movement of key bar 22 either backward or forward will move all of the bars.

It will be noted that movement of key bar 19 will move bar 55 to the right. Movement of key bar 20 will move bars 55 and 54, movement of key bar 21 will move bars 55, 54, and 53 and movement of key bar 22 will move bars 52, 53, 54 and 55.

The bars 52, 53, 54 and 55 control the operation of embossing mechanism and abut at their right hand end against bell crank levers 60, 61, 62 and 63 respectively. A description of one of the levers will suffice for all, and attention is called particularly to Figs. 3 and 9. Each of the bell crank levers is pivoted on a shaft 64 which is mounted in the frame. Each lever controls an embossing marker. One end of the bell crank 63 is in contact with a carriage 65 which supports an idle embossing wheel 66 at its upper end. The carriage 65 may reciprocate with respect to the frame of the machine, being held in position by guides 67 and 68 which are secured to the stationary frame of the machine. A spring 69 is secured to the reciprocable carriage 65, to the guide 68 and tends to keep the carriage in its lower position. Gravity would probably be sufficient to move the frame to its lower position but the spring is added for safety. Carriages 65′, 65″ and 65‴ are similar in construction and operation to carriage 65 being in contact with bell cranks 62, 61 and 60 respectively.

Disposed above the embossing wheel 66 is a coöperating embossing drum 70 which is fixedly secured to the main shaft 71 to which is also secured the operating handle 23. Groove 66′ is oppositely disposed to embossing wheel 66 and similarly other grooves are oppositely disposed to the other embossing wheels.

When control key 19, see Fig. 10, is operated, bar 55 will be moved to the right operating bell crank lever 63, lifting carriage 65 and pushing embossing wheel 66 into position to coöperate with groove 66′ so that a ticket or paper which is fed between the embossing drum 70 and the wheel 66 will have an embossed ridge formed thereon by the embossing wheel 66 and its complementary groove 66′. When key 22 is operated bars 52, 53, 54 and 55 are all moved to the right operating the corresponding bell cranks 60, 61, 62 and 63, lifting the corresponding embossing wheel carriages and causing four embossed ridges to be formed on the ticket.

It will be noted from Fig. 3 that five embossing wheels are shown. The middle embossing wheel 72 is carried on a carriage 73 which is not operated from the control keys. Affixed to the ends of the embossing drum 70 are pins 74 and 75. Slidingly secured to the inclosing casing wall 76 see Fig. 9 is a frame 77 having horizontally extending arms, as indicated at 78, disposed to be engaged by pins 74 and 75, so that with rotation of the drum 70 pins 74 and 75 cause a reciprocating movement of the frame 77. The frame 77 carries a knife bar 79, the latter coöperating with a knife bar 80 fixed to the casing wall 76. As the drum is rotated pins 74 and 75 coöperating with arms 78 cause frame 77 to rise, thereby moving the cutting bar 79 upward causing it to coöperate with cutting bar 80 to cut any paper, such as a ticket, which extends between the bars. There is an opening 81 in the side of the casing 76 through which a ticket issues.

Referring to Fig. 3, embossing wheel carriage 73 is shown resting upon the end of lever 82 which is pivoted on shaft 64. Referring to Fig. 9 lever 82 is shown with one arm disposed beneath the knife bar frame 77. Under normal conditions the knife bar frame 77 is down and embossing wheel carriage 73 is in its proper position with embossing wheel 72 coöperating with groove 72′ in embossing drum 70. Embossing wheel 72 and drum 70 act as a feed to advance a strip of tickets or paper between the embossing drum and wheels and through the slot 81. At the time a ticket is to be cut from the strip it is necessary that movement of the strip be stopped. This is accomplished by embossing wheel 72 being lowered as knife blade 79 rises. The frame 77 rising will permit carriage 73 which rests upon the end of lever 82 to drop.

If, however, there are other embossing wheels coöperating with the corresponding grooves on the embossing drum 70, feeding would still continue. To throw out of operation the other embossing wheels, the bars 52, 53, 54 and 55, particularly shown in Figs. 9, 10 and 11 must be moved to permit the bell crank levers 60, 61, 62 and 63 to turn and lower the embossing wheel carriages. This is accomplished by moving plate 48 to the left, thereby permitting the bell crank levers 60, 61, 62 and 63 to move so that the embossing frames carrying the embossing wheels are dropped and no longer coöperate with the grooves in the embossing drum. To effect movement of the plate 48 to the left, spring 83 is secured to bracket 84 which is attached to the frame of a machine and to bracket 85 secured to plate 48. The normal position of plate 48 is to the left with the bars 52, 53, 54 and 55 so disposed that the bell cranks 60, 61, 62 and 63 permit all but the middle embossing wheel frame 73 to be in their lower position. In order to move plate 48 into position whereby the bars 52, 53, 54 and 55 may raise the embossing wheels into operative position, a bracket 86 upon plate 48 is connected to lever 88. Lever 88 is pivoted at 89 to the stationary main frame of the machine, the free end resting against a cam 90 mounted on the main shaft 71 so that rotation of the shaft will cause the lever to turn, thereby pulling plate 48 to the right, whereby the bars 52, 53, 54 and 55 are in position to raise the embossing wheels. The cam is so formed that when pins 74 and 75 on the embossing drum 70 are out of contact with the arms 78, the lever 88 is held by the cam 90 so that plate 48 is in its right hand position and the embossing wheels will form ridges in the ticket depending upon which key bar has been moved. As the pins 74 and 75 begin to move the knife bar 79 upward to cut the ticket, the lever 88 is allowed by the cam 90 to be moved so that spring 83 will move plate 48 to the left, and thereby position the bars 52, 53, 54 and 55 so that all of the embossing wheels are out of embossing position with their corresponding grooves. The movement of plate 48 is slight and the key bars being long and arranged to have a slight pivotal movement in the slots of plate 25, plate 48 is not hampered in its movement. The upward movement of knife 79 releases the embossing wheel 72, the ribbon of tickets or paper then comes to a stop and the ticket is cut.

It will be noted that under ordinary conditions there is always one embossing ridge in the ticket caused by embossing wheel 72. Key bar 18 may be used for the smallest admission fee and it is not necessary to place an embossing ridge on the ticket, therefore, key bar 18, as particularly shown in Figs. 10 and 11 is not extended to operate any of the bars 52, 53, 54 and 55.

Referring particularly to Figs. 11 and 13 an insulator block 91 is fixedly secured to the key bar 19 by any suitable means such as a screw. Mounted upon block 91 is an electric conducting plate 92. Straddling the key bars is an insulating strip 93 which has disposed along its top an electric conductor 94 connected to one side of an electrical circuit. Mounted upon strip 93 and disposed for engagement with plate 92 is a strap 95 which is of channel form with its cross member disposed in contact with conductors 94, its legs extending along the sides of the strip 93 and ending in outwardly extending feet 96 and 97 which are adapted to be engaged by plate 92 as the block 91 is moved forward or backward. Upon the sides of strip 93, adjacent strap 95 but spaced therefrom are oppositely disposed legs 98 and 99 having feet 100, 101 respectively, adapted to be contacted by plate 92 in either its forward or rearward position. Leg 99 is connected by a conductor 104 to one terminal of a lamp $L^4$, the other terminal of said lamp being connected to conductor 103. Strap 93 is connected to conductor 94 which is in turn connected to conductor 105 leading to flash switch 106, hereinafter described. The flash switch 106 is connected to the other side of the electrical circuit 107.

Pulling the key 19 forward causes plate 92 to be moved into the position shown in dotted lines in Fig. 13, and electrically connect leg 98 and strap 95. Assuming that the flash switch 106 is closed, then a circuit is complete from conductor 107 through flash switch 106, conductor 105, conductor 94, strap 95, leg 98, conductor 104, lamp $L^4$ and conductor 103, thereby lighting the lamp. Movement of key 19 rearward would similarly light lamp $L^1$ as plate 92 would close the electrical circuit by bridging leg 99 and strap 95. Each key controls two lamps setting one or the other lamp for lighting depending on whether the key is pushed or pulled. Thus, to indicate receipt of a certain fee a certain lamp is set to be lighted to indicate the value of the fee. We have shown only four lamps in Figs. 2 and 11. For five keys there would be ten lamps, but as each of the lamps is similarly connected only two are shown for the sake of clearness.

If flash switch 106 was not present in the circuit or was closed at all times, then, upon a key being pushed or pulled, one of the lamps such as $L^1$, would be lighted, and as the bail 38, hereinbefore described, locks the key in position the lamp would continue lighted until another key was operated to release the bail. In order to merely flash the lamp upon the receive of an admission fee the flash switch 106 has been provided.

Referring particularly to Figs. 11, 15 and 16, lever 108 is shown pivoted upon the frame of the machine as indicated at 109. A slot is formed at one end of the lever and a pin 110, which is secured to the plate 48, is disposed in said slot so that as plate 48 is reciprocated lever 108 will be turned. Pivotally secured to lever 108 is a link 111. Link 111 is provided with a shoulder 112 adjacent its free end. A wheel 113 having a groove in its periphery is pivotally mounted upon the frame of the machine and so disposed that link 111 will rest in the groove of the wheel. Spring 114 which is connected to link 111 and lever 108 maintains the link 111 against the wheel. Disposed transversely across the groove of the wheel is a pin 115 so that it may be engaged by the shoulder 112. Connected to a pin 116 fixed on wheel 113 is a spring 117, the other end thereof being connected to a stationary part of the frame of the machine. The spring 117 tends to maintain the wheel 113 in a given position.

Assuming that lever 108 and link 111 are in the position shown in dotted lines in Fig. 16, pin 115 will be disposed behind the shoulder 112 and movement of the lever to the position shown in full lines will cause the wheel 113 to rotate against the pull of the spring 117. As the pin 115 is moved to the left it rises with respect to the link 111, clears the shoulder 112 and the spring 117 snaps the wheel 113 backwardly. The parts are so adjusted that link 111 moves a slight amount to the left after pin 115 rides off the shoulder, thereby insuring that the pin 115 in moving backward will not abut the shoulder.

Mounted upon wheel 113 is a pin 118 which operates a connecting rod 119. Connecting rod 119 is provided with an elongated slot in which pin 118 is disposed, thereby providing a lost motion connection. Referring to Fig. 15 connecting rod 119 carries at its end a block 120 which is adapted to slide between the spring jaws 121 and 122 of a switch member. When block 120 is in the position shown in dotted lines, jaws 121 and 122 are electrically connected and the circuit is completed through the switch, one of the jaws being connected to conductor 107 and the other to conductor 105, as particularly shown in Fig. 11.

It will be noted that a movement of any one of the key bars closes a switch and sets a particular lamp for lighting. For illustration, pulling key bar 19 connects leg 98 and strap 95 partially closing one side of the electric circuit to lamp L⁴. The circuit will be completed upon the operation of flash switch 106. This switch is normally open due to the spring 117 holding the wheel 113 so that block 120 is in the position shown in full lines in Fig. 15. Revolving operating handle 23 causes the plate 48 to be moved to the right, and thereby turns lever 108 moving wheel 113, connecting rod 119, and block 120, thereby closing the flash switch 106 causing the lamp L⁴ to light. The light is only flashed for an instant, as pin 115 rides off the shoulder 112 allowing the spring 117 to return the wheel 113 pulling upon the connecting rod 119 and opening the flash switch.

Referring particularly to Figs. 3 and 5, 123 is a shaft mounted in the frame of a machine and carrying a sleeve 124 upon which are rotatively mounted adding wheels 125, 126, 127 and 128. Adding wheel 125 is fixedly connected to a ratchet wheel 129. Fixedly secured to the ratchet wheel 129 and adding wheel 125 is a recording disk 130. Ratchet wheel 129 is moved by a pawl 131, particularly shown in Fig. 3. Pawl 131 is pivotally connected to a lever arm 132, the other end of said lever being connected by a spring 133 to the stationary frame of the machine. Spring 133 tends to hold pawl 131 in its lower position. A spring 134 connects pawl 131 and lever 132 holding the pawl against the ratchet wheel 129. A stop 135 is mounted on the frame of a machine, and pawl 131 in its upper position comes in contact with stop 135, locking the pawl in the ratchet wheel teeth, thereby preventing a further movement of the ratchet wheel. Pawl 131 is operated to move the ratchet wheel by means of a lever 136 which has pivotally secured to it a connecting rod 137 provided at its upper end with an elongated slot 138 in which is disposed an eccentric 139. Eccentric 139 is fixedly secured to the main shaft 71. Revolution of the operating handle 23 will cause the cam 139 to rotate, pulling the connecting rod 137 upward and moving the lever 136 upon which rests an arm of the lever 132, thereby forcing the pawl upward and moving the ratchet wheel. The number of teeth through which the ratchet wheel will be moved is governed by the control keys.

Referring to Figs. 11 and 14, lever 136 is shown extending across the key bars and pivotally connected by a bracket 140 to the frame of the machine. If lever 136 is permitted to fall to its lowest position the ratchet wheel will be moved the greatest number of teeth. The distance to which lever 136 will fall is governed by the key bars and by the following structure:

Referring again to key bar 19 and particularly to Fig. 14, blocks 141 and 142 are shown disposed on opposite sides of lever 136 and fixedly connected to bar 19. Block 141 is of less height than block 142. As the key bar is moved forward or rearward either block 141 or block 142 is moved under lever 136. In Fig. 14 the dotted lines show the smaller block 141 under the lever 136. If lever 19 is pushed forward, bail 38 locks the key bar in position and block 141 is disposed beneath lever 136 so that upon rotation of the shaft 71 through movement of the operating crank 23, the pawl 131 is permitted to drop the proper number of teeth such as four teeth below the position shown in Fig. 3 and then to be moved upward to the position shown in Fig. 3, thereby rotating the ratchet wheel 125 through four teeth, thereby indicating four admission units, such as four nickels. If key bar 19 is pulled, block 142 will be disposed beneath lever 136 and pawl 131 will drop sufficient to move the ratchet wheel only through three teeth. The blocks 143 and 144 on key bar 18 are higher than block 142 and are arranged to adjust the pawl to move the ratchet wheel 1 and 2 teeth respectively.

Adding wheel 125 has an eccentric hub 145, see Fig. 5, and a mechanism is operated by the eccentric hub to move adding wheel 126. Wheel 126 is similarly provided with an eccentric hub and mechanism operated by it to move adding wheel 127.

Adding wheel 127 has an eccentric hub 146 and a mechanism operatively connected to eccentric 146 to move adding wheel 128. As the eccentric and mechanism for each of the wheels is similar a description of one will be given.

Referring to Figs. 5, 6, 7 and 8, eccentric hub 146 has mounted upon it an eccentric strap 147 to which are secured arms 148 and 149. Arm 149 is provided with an off-set 150 which is disposed to coöperate with a movable wedge 151. Wedge 151 is secured to a member 152 which is pivotally secured to a stationary part of the frame. Spring 153 is secured to the member 152 adjacent its periphery and to a stationary part of the frame. A stop 155 fixed on member 152 is disposed to abut a pin 156 mounted on the frame of the machine. Spring 153 tends to maintain member 152 in a given position, while stop 155 and pin 156 prevent the member 152 from being rotated beyond a given position. As wheel 127 moves through a complete revolution, eccentric 146 moves a complete revolution and in its movement forces arm 149 into the position shown in dotted lines in Fig. 7. The off-set 150 rides under the wedge 151 and lifts the latter, the wedge being pulled back into position by spring 153 as the arm 149 reaches its position at the left. Wedge 151 is then in such a position that movement of arm 149 to the right will cause off-set 150 to ride upward over the face of the wedge. Each of the adding wheels 125, 126, 127 and 128 have teeth on the sides adjacent the periphery. These teeth indicated on wheel 128 by reference numeral 157 are engaged by catch 158 disposed on the arm 149, and arranged to extend around the periphery of the wheel to engage the teeth. A catch 154 is disposed on the end of arm 148 and is so arranged that when catch 158 is engaged with the teeth, catch 154 is out of engagement and when catch 154 is engaged catch 158 is disengaged, thereby preventing retrograde movement of the adding wheels. When arms 149 and 148 are in forward position, catch 154 is engaged with teeth 157 locking the wheel against retrograde movement.

As arm 149 is pulled backward by the eccentric 146 the off-set 150 riding over the wedge 151 causes the arm 149 to rise and carry with it the catch 158, moves the arm 149 and catch backward into engagement with teeth 157 and spring 185 pulls the arm 149 downward thereby moving adding wheel 128. One complete revolution of the adding wheel 125 rotates adding wheel 126 one tooth or a unit angle. A complete revolution of adding wheel 126 moves adding wheel 127 through one unit angle, and a complete revolution of adding wheel 127 moves adding wheel 128 a unit angle. The periphery of the adding wheels may have numerals marked thereon and be exposed to view through an opening at the top of the casing as indicated at M in Fig. 1, so that the amount added by the machine can be read directly. The opening may be concealed by a cover suitably locked so that none except those entitled to may have access thereto.

Disk 130 has a needle 159 extending laterally from its surface. An arm 160 is fixedly connected to a sleeve 161 which is in turn fixedly connected to adding wheel 126 so that arm 160 will move the wheel 126. Arm 160 is provided with a needle 162. Needles 159 and 162 are provided to mark a cipher record sheet to indicate the reading of the adder at any particular time.

A sliding frame 163 is mounted so that it may be moved to the right or left, see Fig. 5. The frame is guided upon shaft 123 and upon a bar 164. Spring 165 tends to keep the frame in its outer position with respect to the disk 130 and is disposed to abut a portion of the frame and a standard 166, the latter being secured to the stationary frame of the machine. Frame 163 is provided with a rabbet or recess 167 adapted to receive a card or a frame carrying a card as found convenient. This card is indicated generally by 168. It is apertured so that extension 169 of shaft 123 can pass through the aperture. The card 168 is disposed in the rabbet and held there by any convenient mechanical expedient, such as a door 170. A movement of the frame 163 to the left of the position shown in Fig. 5 will cause the record card 168 to be moved against the needle points 159 and 162 causing punctures therein indicating the position of the adding wheels. The record card is intended to be removed at the time a cashier takes up her shift and at the time she leaves, thereby indicating by the punctures the number of admission fees which have been received up to that time.

In order to insure that the record card will not be tampered with, and that a record will be made when a card is inserted or removed, the machine is so constructed that the record card can only be removed and inserted by opening of a door. This door is indicated by 170 and is hinged to the frame 163. In Fig. 5 the dotted lines show the door closed. Door 170 is provided with a peripheral flange and lugs 171 and 172. Referring to Fig. 3, these lugs are provided with slots and serve as keepers for latches 173 and 174 respectively. Latches 173 and 174 are mounted upon a bar 175 and are preferably integral therewith. When the door 170 is closed and bar 175 is moved to the left the door will be locked, when moved to the right the door will be unlocked. To move bar 175, a bell crank lever 176 has one arm pivotally connected to the bar and the other arm connected to a link 177 which is provided with a slot at its lower end through which extends a lever 178. Lever 178 is pivoted to the stationary part of the frame, as indicated at 179. Connected to lever 178 by a link is a crank arm 180 which is fixedly secured to a shaft 181. Shaft 181 has a second crank arm fixedly secured thereto, as indicated at 182, the latter crank arm being connected to the sliding frame 163 by a link. Lever 178 extends forward and through the casing of the mechanism, as shown in Fig. 1 and rides in a horizontally disposed slot in the wall of the casing having two recesses, one at the upper side of the slot adjacent the center and one at the lower side of the slot at the end. A movement of lever 178 to the right or left will cause shaft 181 to be oscillated by reason of crank arm 180. Oscillation of shaft 181 causes the sliding frame 163 to be moved by reason of the crank arm 182.

Assume that the door 170 is closed with a record card 168 in position, lever 178 is in the position shown in Fig. 1, the cashier is about to leave and before doing so she is required to turn in her record card. The door 170 must be unlocked. In order to do this, lever 178 is pushed to the left hand end of the slot and down into the lower recess. Moving the lever to the left causes the sliding frame 163 to be pulled up very close to the needles 159 and 162, thereby making large punctures. Pushing the lever 178 downward into the recess moves link 177 downwardly, causes bar 175 to be pulled to the right and latches 171 and 172 from keepers 173 and 174, thereby unlocking the door 170. The latter may now be opened, the lever 178 returned to the right, thereby moving sliding frame 163 to the right and the card removed. A new record card 168 is now placed in the frame 163 and the same record must be made on the card at the start of work by the next cashier as was made by the last cashier upon leaving. In order to insure such a mark, door 170 is closed, and in order to lock the same bar 178 is moved to the left and into the upper recess. Moving the lever 178 to the left causes the frame 163 to move record card 168 against the needle points 159 and 162, but the lever 178 not being moved as far as when the door is unlocked, the punctures made by the needles are not as large. Moving the lever 178 upward causes link 177 to be moved upward, and thereby moves bar 175 to the left forcing latches 171 and 172 into the keepers 173 and 174. Lever 178 is now moved to the right leaving the door 170 locked and freeing the card 168 from the needles.

It will be evident that the door cannot be unlocked without making a record on the record card. A record is made when a card is inserted and when removed. This card may be read by means of a key not described herein, as it is not a part of the invention. A cipher record card is made so that the cashier is not aware as to reading of the machine and cannot doctor her receipts in case of an error.

Where reserved tickets are sold and it is desired to date the ticket with the day of the sale, and also to make a record of the receipt of the fee for the ticket a dating mechanism is provided.

Referring to Figs. 3 and 4 we have disclosed a printing mechanism which comprises a type ribbon 184 provided with type indicating the date. Type ribbon 184 is mounted upon advancing wheels 185 and 186. These wheels are normally stationary and the ribbon is adjusted from day to day. Wheels 185 and 186 are mounted within a frame 187 which is removable so that the type ribbon may be adjusted by removing the frame 187 and advancing the wheels 185 and 186 the desired amount. An endless inking ribbon 188 is disposed about idler rollers 189, 190 and 191. A fourth roller 192 is provided and is connected to a ratchet wheel 193.

The ribbon 188 is advanced by the roller 192. A pawl 194 is mounted on an eccentric 195, the latter being fixedly secured to the main shaft 71 so that revolution of the operating handle 23 will cause a rotation of the eccentric 195. Eccentric 195 extends along the shaft and overhangs a pressure member 196. Pressure member 196 is disposed above wheel 185 so that if a ticket is placed between pressure member 196 and wheel 195 and member 196 is pressed downward a date will be printed upon the ticket. Pressure member 196 is mounted upon an arm of a bell crank lever 197, the other arm having a spring 198 secured thereto, said spring being secured at one end to the stationary frame of the machine. Spring 198 tends to hold the pressure member 196 upward against eccentric 195.

It will be noted that eccentric 195 and pressure member 196 are spaced from each other such that when member 196 is in contact with eccentric 195 movement of the eccentric will not force the member 196 against a ticket. We have provided means whereby the dating mechanism may be adjusted to date tickets or may be thrown out of operation. These results are accomplished by means of a slotted lever 199 which is mounted upon a pin 200 so that it may have sliding movement. Upon one side of the lever 199 is a block or lug 201 and so disposed that if lever 199 is pulled to the left from the position indicated in Fig. 4, block 201 will be disposed between eccentric 195 and pressure member 196, so that rotation of the eccentric will cause the block 201 to be moved downward and with it pressure member 196. A convenient means for moving lever 199 consists of a link 202 pivotally connected to the casing of the machine at one end and by a pivot pin to the lever 199. A key 203 is secured to the link 202 and extends through the casing so that it is convenient for operation by the cashier. If key 203 is pulled outward so that block 201 is disposed between eccentric 195 and pressure pad 196 a ticket may be dated.

Assuming that a purchaser buys a reserved seat, the ticket is taken from the usual ticket rack, placed in the slot 204, the proper control key 18, 19, 20, 21 or 22, as the case may be, is moved and the handle 23 turned. The eccentric 195 presses upon the member 196 and forces the ticket against the inking ribbon 185 and the type ribbon 184, thereby dating the ticket. The turning of the crank handle also causes the adding and flash apparatus to operate.

We have also provided means for throwing the entire mechanism out of operation. This is advantageous where the cashier leaves the office, such as when the office is closed, and it is desirable then to lock the mechanism so that it cannot be tampered with. We have provided means for accomplishing this which is particularly shown in Figs. 3 and 11. A sliding bar 205 is provided having a double face wedge 206 at one end and underlying the bail 38. A key 207 is secured to one end of the bar and is disposed in front of the cashier convenient for operation. Pulling the key outward will cause the bail 38 to ride over the wedge face lifting the bail and releasing the keys so that they are all in neutral position and will not be locked by either a forward or backward pull. Secured to bar 205 is a lever 208 which extends upward and serves as a support for a lever 209 which is pivotally connected to the stationary frame of the machine. Lever 209 has a finger which is adapted to drop into notches on the periphery of a wheel 210. In normal position lever 208 holds lever 209 upward with the finger out of the notches. As key 207 is pulled outward the end of lever 208 moves into the recess formed on lever 209 permitting the latter to drop and the finger to move into a notch on wheel 210. Wheel 210 is fixedly secured to shaft 71 and shaft 71 will thereby be locked.

In order that bar 205 may be locked in its outer position we have shown diagrammatically an ordinary door lock such as a Yale lock indicated by 211. As key 207 is moved into its outer position the lock 211 is operated by a key to lock the key 207 in its outer position so that it cannot be moved by any one except by one possessing the key to lock 211.

The gate control mechanism "C" is operated by an eccentric 212 mounted on shaft 71. An eccentric strap 213 connected to a connecting rod 214 is disclosed in Fig. 3. Rod 214 extends upward through one of the standards "S" as shown in Fig. 1, and is connected to the gate control mechanism, which, as it does not form a part of this invention, is not described herein.

Referring particularly to Fig. 2 a wiring diagram is shown for the flashing mechanism, and also the connections to the gate control mechanism. The switch mechanism on control key bar 18 is illustrated by two switches 18' and 18". The switch mechanism on the control key bar 19 is illustrated by two independent switches 19' and 19". Each of the other control key bars would have two lamps, but the connections to only two of the key bars are shown in order to avoid a complex diagram which would merely duplicate certain parts already shown and cause confusion.

Movement of a control key bar would close one of the switches such as for illustration 18'. This would place lamp $L^3$ in condition for flashing upon the operation of flash switch 106. We have also illustrated a lamp $L^{13}$ in parallel with lamp $L^3$ so that lamp $L^{13}$ will be operated at the same time that lamp $L^3$ is operated. One lamp such as $L^3$ may be disposed in the ticket office, while the other lamp may be disposed within the auditorium, or any other convenient place, so that an observer may know whether a fee has been registered upon the entrance of a person into the auditorium. If desirable, other lights may be placed in parallel and thus a flash may be given at any desired place. Switch 213 is a manual switch to control the gate, the operation of which is not described herein.

It will be obvious that we have provided a mechanism controlled by the operation of a control key and turning of a handle which will emboss tickets indicating the price, will add the amount upon an adding mechanism, operate a visual signal to indicate the amount and requires the cashier to make a cipher record of the business done during her shift. This cipher record is such that it can be read by means of a key. The operation of the handle also controls a gate mechanism, which forms the subject matter of another application.

What we claim is:

1. In a recording device, the combination of an adding machine, comprising a set of adding disks, needles mounted adjacent said disks and movable therewith; a movable frame provided with a door, and means for holding a record sheet; a lock for said door; mechanism for operating said lock; and means connected to said mechanism and to said lock for operatively moving said frame a given distance on locking the door and a different distance on unlocking the door, whereby to mark said sheet upon operation of said lock with distinguishing marks.

2. In a recording device, the combination of an adding machine, comprising a set of adding disks; needles mounted adjacent said disks and movable therewith; a movable frame provided with a door and means for holding a record sheet; a lock for said door; mechanism for operating said lock comprising a longitudinally movable link; a lever movable transversely and longitudinally to said link and connected thereto to move said link longitudinally; and links connected to said lever and to said frame to move the latter when said lever is moved transverse to said first named link.

3. In a recording device, the combination of an adding machine, comprising a set of adding disks, puncture needles mounted adjacent said disks and arranged to move in one plane on an actuation of said disks; a movable frame provided with a door and means for holding a record sheet; a lock for said door; mechanism for operating said lock comprising a longitudinally movable link; a lever movable transversely and longitudinally to said link and connected thereto to move said link longitudinally; links connected to said lever and to said frame to move the latter when said lever is moved transversely to said first named link; and a plate having a slot in which the end of said lever is disposed, said slot elongated to permit said transverse movement of said lever and having notches disposed at different points to define longitudinal movements of said lever in locking and unlocking said door.

In witness that we claim the foregoing we have hereunto subscribed our names this 17th day of November, 1915.

ROBERT M. CAMPBELL.
LAWRENCE S. CAMPBELL.